United States Patent
Marzolla et al.

(10) Patent No.: US 9,006,368 B2
(45) Date of Patent: *Apr. 14, 2015

(54) PROPYLENE-BASED TERPOLYMERS FOR FILM

(75) Inventors: Roberta Marzolla, Occhiobello (IT); Monica Galvan, S. Maria Maddalena (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/821,134

(22) PCT Filed: Aug. 31, 2011

(86) PCT No.: PCT/EP2011/064934
§ 371 (c)(1),
(2), (4) Date: Mar. 6, 2013

(87) PCT Pub. No.: WO2012/031951
PCT Pub. Date: Mar. 15, 2012

(65) Prior Publication Data
US 2013/0165613 A1    Jun. 27, 2013

Related U.S. Application Data

(60) Provisional application No. 61/403,365, filed on Sep. 14, 2010.

(30) Foreign Application Priority Data

Sep. 6, 2010 (EP) .................................... 10175384

(51) Int. Cl.
*C08F 210/06* (2006.01)
*C08F 210/14* (2006.01)
*C08F 210/16* (2006.01)
*C08F 10/14* (2006.01)

(52) U.S. Cl.
CPC ..................................... *C08F 10/14* (2013.01)

(58) Field of Classification Search
USPC ............................................... 526/348.5, 348
See application file for complete search history.

(56) References Cited

U.S. PATENT DOCUMENTS

| | | | |
|---|---|---|---|
| 4,826,939 A * | 5/1989 | Stuart, Jr. .................... | 526/348.5 |
| 6,562,478 B1 | 5/2003 | Fischer et al. | |
| 6,583,253 B1 * | 6/2003 | Fischer et al. ................ | 526/348 |
| 8,017,206 B2 * | 9/2011 | De Palo et al. ............. | 428/36.92 |
| 2007/0255023 A1 * | 11/2007 | Razavi et al. ................. | 526/114 |
| 2013/0030137 A1 * | 1/2013 | Cavalieri et al. ........... | 526/348.5 |

OTHER PUBLICATIONS

PCT International Search Report & Written Opinion mailed Mar. 15, 2012, for PCT/EP2011/064934.

* cited by examiner

Primary Examiner — Rip A. Lee

(57) ABSTRACT

A propylene/ethylene/1-hexene terpolymer containing from 1.0 wt % to 2.5 wt %, of ethylene derived units and from 2.0 wt % to 3.5 wt % of 1-hexene derived units, the sum of the amounts of propylene, ethylene and 1-.hexene derived units being 100, having the following features: a) the amount (Wt %) of 1-hexene (C6) and the amount (Wt %) of ethylene (C2) fulfill the following relation (i): $0.5 < C6 - C2 < 1.7$ (i) wherein C2 is the % wt of ethylene derived units content and C6 is the % wt of 1-hexene derived units content b) Polydispersity index (PI) ranging from 2 to 4.5; c) melting temperature ranges from 125° C., to 138° C.; d) the melting temperature (Tm) and the sum of ethylene content (C2 wt %) and 1-hexene content (C6 wt %) fulfill the following relation (ii) $C2 + C6 < 37 - 0.24 \ast Tm$ (ii) e) The melt flow rate (MFR) ranges of from 4 to 7 g/10' dg/min, according to ISO method 1133 (230° C., 2.16 kg).

9 Claims, No Drawings

PROPYLENE-BASED TERPOLYMERS FOR FILM

This application is the U.S. National Phase of PCT International Application PCT/EP2011/064934, filed Aug. 31, 2011, claiming priority of European Patent Application No. 10175384.6, filed Sep. 6, 2010 and the benefit under 35 U.S.C. 119(e) of U.S. Provisional Application No. 61/403,365, filed Sep. 14, 2010, the contents of which are incorporated herein by reference in their entirety.

The present invention relates to a propylene/ethylene/1-hexene terpolymer particularly fit for the production of biaxially oriented films.

Propylene/ethylene/1-hexene terpolymers are already known in the art for the production of pipes or films.

EP 483 523 relates to a compositions of crystalline polymers of propylene of this invention comprise (weight percentage):

A) 30-65%, preferably 35-65%, more preferably 45-65%, of a copolymer of propylene with a $C_4$-$C_8$ alpha olefin containing from 98 to 80%, preferably from 95 to 85%, of propylene;

B) 35-70%, preferably 35-65%, more preferably 35-55%, of a copolymer of propylene with ethylene, and optionally from 2 to 10%, preferably from 3 to 6%, of a $C_4$-$C_8$ alpha-olefin, said copolymer containing 2 to 10% ethylene, preferably from 7 to 9% when the $C_4$-$C_8$ alpha-olefin is not present, and 0.5 to 5%, preferably from 1 to 3% ethylene, when the $C_4$-$C_8$ alpha-olefin is present.

The $C_4$-$C_8$ alpha-olefin is preferably selected from 1-butene; 1-pentene; 1-hexene; 4-methyl-1-pentene; and 1-octene. Particularly preferred is 1-butene.

The applicant found that better results in terms of seal initiation temperature can be obtained by using 1-hexene instead of the preferred monomer 1-butene in particular ranges.

WO2006/002778 relates to a pipe system comprising a terpolymer of propylene/ethylene and alpha olefin wherein the ethylene content is from 0 to 9% by mol, preferably from 1 to 7% by mol and the 1-hexene content ranges from 0.2 to 5% wt. The applicant found that it is possible to select from these ranges a composition having improved properties to be used for films.

U.S. Pat. No. 6,365,682 relates to propylene based terpolymers to be used for films. The ethylene content ranges generally from 1 to 10 wt % and the alpha olefin ranges from 5 to 25 wt %. for the preparation of films terpolymers having an ethylene content ranging from 0.9 to 3 wt % and an alpha olefin content ranging from 1 to 15 wt % is indicated. Only terpolymer of propylene/ethylene and 1-butene are exemplified. The applicant found that when 1-hexene is used in particular amount the characteristics of the films can be improved.

The applicant has now found that the seal initiation temperature (SIT), the melting temperature and the crystallization temperature can be improved in a well balance mix of other properties when a particular proportion of comonomer amounts is used in copolymers having particular MFR values so that to achieve a material particularly fit for obtaining biaxially oriented films (BOPP).

Thus an object of the present inventions is a propylene/ethylene/1-hexene terpolymer containing from 1.0 wt % to 2.5 wt % preferably from 1.5 wt % to 2.5 wt %, more preferably from 1.6 wt % to 2.2 wt % of ethylene derived units and from 2.0 wt % to 3.5 wt % preferably from 2.5 wt % to 3.5 wt %, more preferably preferably from 2.6 wt % to 2.9 wt % of 1-hexene derived units, the sum of amounts of propylene, ethylene and 1-.hexene derived units being 100, having the following features:

a) the amount (Wt %) of 1-hexene (C6) and the amount (Wt %) of ethylene (C2) fulfil the following relation (i):

$$0.5 < C6 - C2 < 1.7 \qquad (i)$$

preferably the relation (i) is $0.7 < C6 - C2 < 1.7$; more preferably the relation is $1.1 < C6 - C2 < 1.7$; even more preferably the relation is $1.4 < C6 - C2 < 1.6$ wherein C2 is the % wt of ethylene derived units content and C6 is the % wt of 1-hexene derived units content;

b) polydispersity index (PI) ranging from 2 to 4.5; preferably ranging from 3 to 4.5;

c) the melting temperature ranges from 125.0° C., to 138.0° C., preferably from 130.0° C. to 137.0° C.; more preferably from 130.0° C. to 135.0° C.;

d) the melting temperature (Tm) and the sum of ethylene content (C2 wt %) and 1-hexene content (C6 wt %) fulfil the following relation (ii)

$$C2 + C6 < 37 - 0.24 * Tm \qquad (ii)$$

Preferably the relation (ii) is $C2 + C6 < 36.8 - 0.24 * Tm$; more preferably the relation (ii) is $C2 + C6 < 36.7 - 0.24 * Tm$;

e) The melt flow rate (MFR) according to ISO method 1133 ranges from 4 to 7 g/10 min; preferably from 4.5 to 6.5 g/10 min.

With the terpolymer of the present invention is possible to achieve a very high delta between the melting temperature and the seal initiation temperature (SIT). This delta, i.e. the difference between the melting temperature and the SIT, can ranges from 20° C. to 26° C. preferably from 20° C. to 24° C. more preferably between 20° C. and 23° C. At the same time the melting temperature of the terpolymers of the present invention are low with respect to the amount of comonomer used. Thus it is possible to use lower amount of comonomers and achieve at the same time low melting temperature so that the final material can be melted and extruded by using less energy.

Preferably the terpolymer of the present invention has a solubility in xylene at 25° C. below 10.0 wt % preferably below 9.0 wt % more preferably below 8.0% wt.

Preferably the crystallization temperature (Tc) ranges from 70° C. to 100° C., preferably from 80° C. to 95° C.; more preferably from 83° C. to 92° C.

Preferably the polydispersity index (PI) ranges from 2 to 5 preferably from 2 to 4.5, preferably from 2.5 to 4.4.

The terpolymer of the present invention further exhibits a seal initiation temperature (SIT) comprised between 100° C. and 120° C., preferably between 108° C. and 117° C.; more preferably between 109° C. and 113° C.

In order to achieve the MFR of the terpolymer of the present invention it is also possible to visbreak a polymer having a lower MFR. In order to visbreak the polymer known visbreaking agent can be used such as peroxides. With the visbreaking it is possible to fine tune the MFR of the product.

The terpolymer of the present invention have a stereoregularity of isotactic type of the propylenic sequences this is shown by low amount of xylene solubles at 25° C.

The terpolymer used in the present invention can be prepared by polymerisation in one or more polymerisation steps. Such polymerisation can be carried out in the presence of Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminium compound, such as an aluminium alkyl compound.

An external donor is optionally added.

The catalysts generally used in the process of the invention are capable of producing polypropylene with a value of xylene insolubility at ambient temperature greater than 90%, preferably greater than 95%.

Catalysts having the above mentioned characteristics are well known in the patent literature; particularly advantageous are the catalysts described in U.S. Pat. No. 4,399,054 and European patent 45977. Other examples can be found in U.S. Pat. No. 4,472,524.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids. Particularly suitable electron-donor compounds are esters of phtalic acid and 1,3-diethers of formula:

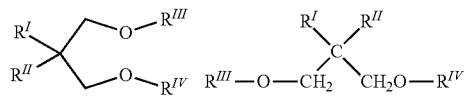

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, said structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatom(s) as substitutes for carbon or hydrogen atoms, or both. Ethers of this type are described in published European patent applications 361493 and 728769.

Representative examples of said diethers are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, 9,9-bis(methoxymethyl)fluorene.

Other suitable electron-donor compounds are phthalic acid esters, such as diisobutyl, dioctyl, diphenyl and benzylbutyl phthalate.

The preparation of the above mentioned catalyst components is carried out according to various methods.

For example, a $MgCl_2 \cdot nROH$ adduct (in particular in the form of spheroidal particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds, which can be used for the preparation of the solid catalyst component, are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups.

The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si—OR bond, where R is a hydrocarbon radical.

Examples of silicon compounds are $(tert\text{-}butyl)_2Si(OCH_3)_2$, $(cyclohexyl)(methyl)Si(OCH_3)_2$, $(cyclopentyl)_2Si(OCH_3)_2$ and $(phenyl)_2Si(OCH_3)_2$ and $(1,1,2\text{-trimethylpropyl})Si(OCH_3)_3$. 1,3-diethers having the formulae described above can also be used advantageously. If the internal donor is one of these diethers, the external donors can be omitted.

In particular, even if many other combinations of the previously said catalyst components may allow to obtain propylene polymer compositions according to the present invention, the terpolymers are preferably prepared by using catalysts containing a phthalate as inside donor and (cyclopentyl)$_2$Si(OCH$_3$)$_2$ as outside donor, or the said 1,3-diethers as inside donors.

The said propylene-ethylene-hexene-1 polymers are preferably produced by a polymerisation process carried out in at least two interconnected polymerisation zones.

The process according to the preferred process is illustrated in EP application 782 587.

In detail, the said process comprises feeding the monomers to said polymerisation zones in the presence of catalyst under reaction conditions and collecting the polymer product from the said polymerisation zones. In the said process the growing polymer particles flow upward through one (first) of the said polymerisation zones (riser) under fast fluidisation conditions, leave the said riser and enter another (second) polymerisation zone (downcomer) through which they flow downward in a densified form under the action of gravity, leave the said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it become to possible to reintroduce the polymer into the riser without the help of special mechanical means. In this way, a "loop" circulation is set up, which is defined by the balance of pressures between the two polymerisation zones and by the head loss introduced into the system.

Generally, the condition of fast fluidization in the riser is established by feeding a gas mixture comprising the relevant monomers to the said riser. It is preferable that the feeding of the gas mixture is effected below the point of reintroduction of the polymer into the said riser by the use, where appropriate, of gas distributor means. The velocity of transport gas into the riser is higher than the transport velocity under the operating conditions, preferably from 2 to 15 m/s. Generally, the polymer and the gaseous mixture leaving the riser are conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be effected by means of a recycle line for the gaseous mixture.

The control of the polymer circulating between the two polymerisation zones can be effected by metering the amount of polymer leaving the downcomer using means suitable for controlling the flow of solids, such as mechanical valves.

The operating parameters, such as the temperature, are those that are usual in olefin polymerisation process, for example between 50 to 120° C.

This first stage process can be carried out under operating pressures of between 0.5 and 10 MPa, preferably between 1.5 to 6 MPa.

Advantageously, one or more inert gases are maintained in the polymerisation zones, in such quantities that the sum of the partial pressure of the inert gases is preferably between 5 and 80% of the total pressure of the gases. The inert gas can be nitrogen or propane, for example. In particular in order to obtain the terpolymers of the present invention no barrier feed has to be used between the two interconnected zones The various catalysts are fed up to the riser at any point of the said riser. However, they can also be fed at any point of the downcomer. The catalyst can be in any physical state, therefore catalysts in either solid or liquid state can be used.

The terpolymer of the present invention, may be blended with additives commonly employed in the art, such as antioxidants, light stabilizers, heat stabilizers, nucleating agents, colorants and fillers.

The following examples are given to illustrate the present invention without limiting purpose.

EXAMPLES

Characterization Methods

Melting temperature and crystallization temperature: Determined by differential scanning calorimetry (DSC). weighting 6±1 mg, is heated to 220±1° C. at a rate of 20° C./min and kept at 220±1° C. for 2 minutes in nitrogen stream and it is thereafter cooled at a rate of 20° C./min to 40±2° C., thereby kept at this temperature for 2 min to crystallise the sample. Then, the sample is again fused at a temperature rise rate of 20° C./min up to 220° C.±1. The melting scan is recorded, a thermogram is obtained, and, from this, melting temperatures and crystallization temperatures are read.

Melt Flow Rate: Determined according to the method ISO 1133 (230° C., 2.16 kg).

Solubility in xylene: Determined as follows: 2.5 g of polymer and 250 ml of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

1-hexene and ethylene content: Determined by $^{13}$C-NMR spectroscopy in terpolymers. $^{13}$C NMR spectra are acquired on an AV-600 spectrometer operating at 150.91 MHz in the Fourier transform mode at 120° C. The peak of the propylene CH was used as internal reference at 28.83. The $^{13}$C NMR spectrum is acquired using the following parameters:

| | |
|---|---|
| Spectral width (SW) | 60 ppm |
| Spectrum centre (O1) | 30 ppm |
| Decoupling sequence | WALTZ 65_64pl |
| Pulse program [1] | ZGPG |
| Pulse Length (P1) [2] | for 90° |
| Total number of points (TD) | 32K |
| Relaxation Delay [2] | 15 s |
| Number of transients [3] | 1500 |

The total amount of 1-hexene and ethylene as molar percent is calculated from the diads using the following relations:

$$[P]=PP+0.5PH+0.5PE$$

$$[H]=HH+0.5PH$$

$$[E]=EE+0.5PE$$

Assignments of the $^{13}$C NMR spectrum of propylene/1-hexene/ethylene copolymers have been calculated according to the following table:

| Area | Chemical Shift | Assignments | Sequence |
|---|---|---|---|
| 1 | 46.93-46.00 | $S_{\alpha\alpha}$ | PP |
| 2 | 44.50-43.82 | $S_{\alpha\alpha}$ | PH |
| 3 | 41.34-4.23 | $S_{\alpha\alpha}$ | HH |
| 4 | 38.00-37.40 | $S_{\alpha\gamma} + S_{\alpha\delta}$ | PE |
| 5 | 35.70-35.0 | $4B_4$ | H |
| 6 | 35.00-34.53 | $S_{\alpha\gamma} + S_{\alpha\delta}$ | HE |
| 7 | 33.75 33.20 | CH | H |
| 8 | 33.24 | $T_{\delta\delta}$ | EPE |
| 9 | 30.92 | $T_{\beta\delta}$ | PPE |
| 10 | 30.76 | $S_{\gamma\gamma}$ | XEEX |
| 11 | 30.35 | $S_{\gamma\delta}$ | XEEE |
| 12 | 29.95 | $S_{\delta\delta}$ | EEE |
| 13 | 29.35 | $3B_4$ | H |
| 14 | 28.94-28.38 | CH | P |
| 15 | 27.43-27.27 | $S_{\beta\delta}$ | XEE |
| 16 | 24.67-24.53 | $S_{\beta\beta}$ | XEX |
| 17 | 23.44-23.35 | $2B_4$ | H |
| 18 | 21.80-19.90 | $CH_3$ | P |
| 19 | 14.22 | $CH_3$ | H |

Polydispersity Index (PI): Determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

$$P.I.=10^5/Gc$$

in which Gc is the crossover modulus which is defined as the value (expressed in Pa) at which G'=G" wherein G' is the storage modulus and G" is the loss modulus.

(Sealing Initiation Temperature (SIT). For each test two of the BOPP films are superimposed in alignment, the adjacent layers being layers of the particular test composition. The superimposed specimens are sealed along one of the 2 cm sides with a Brugger Feinmechanik Sealer, model HSG-ETK 745. Sealing time is 5 seconds at a pressure of 0.1 N/mm². The sealing temperature is increased of 2° C. for each seal, starting from about 10° C. less than the melting temperature of the test composition. The sealed samples are left to cool and then their unsealed ends are attached to an Instron machine where they are tested at a traction speed of 50 mm/min. The SIT. is the minimum sealing temperature at which the seal does not break when a load of 2 Newtons is applied in the said test conditions.

Haze on film. Determined on 50 μm thick films of the test composition, prepared as described above. The measurement was carried out on a 50×50 mm portion cut from the central zone of the film. The instrument used for the test was a Gardner photometer with Haze-meter UX-10 equipped with a G.E. 1209 lamp and filter C. The instrument calibration was made by carrying out a measurement in the absence of the sample (0% Haze) and a measurement with intercepted light beam (100% Haze).

Gloss on film. Determined on the same specimens as for the Haze. The instrument used for the test was a model 1020 Zehntner photometer for incident measurements. The calibration was made by carrying out a measurement at incidence angle of 60° on black glass having a standard Gloss of 96.2% and a measurement at an incidence angle of 45° on black glass having a standard Gloss of 55.4%.

Examples 1-5

Copolymers are prepared by polymerising propylene, ethylene and hexene-1 in the presence of a catalyst under continuous conditions in a plant comprising a polymerisation apparatus as described in EP 1 012 195.

The catalyst is sent to the polymerisation apparatus that comprises two interconnected cylindrical reactors, riser and downcomer. Fast fluidisation conditions are established in the riser by recycling gas from the gas-solid separator. In examples 1-5 no barrier feed has been used.

The catalyst employed comprises a catalyst component prepared by analogy with example 5 of EP-A-728 769 but using microspheroidal $MgCl_2 \cdot 1.7C_2H_5OH$ instead of $MgCl_2 \cdot 2.1C_2H_5OH$. Such catalyst component is used with dicyclopentyl dimethoxy silane (DCPMS) as external donor and with triethylaluminium (TEA).

The polymer particles exiting the reactor are subjected to a steam treatment to remove the reactive monomers and volatile substances and then dried. The main operative conditions and characteristics of the produced polymers are indicated in Tables 1 and Table 2.

TABLE 1

|  |  | Examples | | | | |
|---|---|---|---|---|---|---|
|  |  | 1 | 2 | 3 | 4 | 5 |
| TEA/solid catalyst component, g/g | | 5 | 5 | 5 | 5 | 5 |
| TEA/DCPMS, g/g | | 4 | 4 | 4 | 4 | 4 |
| C6/(C3 + C6), mol/mol | Riser | 0.033 | 0.033 | 0.031 | 0.024 | 0.026 |

TABLE 1-continued

|  |  | Examples | | | | |
|---|---|---|---|---|---|---|
|  |  | 1 | 2 | 3 | 4 | 5 |
| C2/(C3 + C2), mol/mol | Riser | 0.016 | 0.015 | 0.015 | 0.007 | 0.011 |

C2 ethylene;
C3 propylene;
C6 1-hexene

The polymers of the different Examples haven been added with additives and peroxides according to table 2. Then the polymer mixtures have been placed in a twin screw extruder Berstorff (L/D=33) and extruded in the following operating conditions:
temperature of feeding part: 190-210° C.;
melt temperature: 235-245° C.;
temperature of die part: 210° C.;
flow rate: 15 kg/h;
rotational speed of the screw: 250 rpm.

TABLE 2

|  |  | ex | | | | |
|---|---|---|---|---|---|---|
|  |  | 1 | 2 | 3 | 4 | 5 |
| A.O.1010 | wt % | 0.05 | 0.05 | 0.05 | 0.05 | 0.05 |
| Ca stear. | wt % | 0.05 | 0.05 | 0.05 | 0.05 | 0.05 |
| M.S.168 | wt % | 0.1 | 0.1 | 0.1 | 0.1 | 0.1 |
| Luperox | wt % | 0.02 | 0.032 | 0.025 | 0.025 | 0.025 |

Biaxially oriented films of the polymers of examples 1-5 have been produced. The analysis of the films and the characteristics of the polymers are reported on table 3

TABLE 3

|  |  | Ex1 | Ex2 | ex 3 | Ex4 | Ex5 |
|---|---|---|---|---|---|---|
| XS | % | 6.7 | 6 | 6.3 | 2.7 | 4 |
| Polydispersity index | | 4.0 | 4.1 | 3.9 | 4.0 | 4.1 |
| MFR | g/10 min | 5.2 | 5.5 | 6.3 | 6.6 | 6.8 |
| C6 NMR | wt % | 2.7 | 2.7 | 2.9 | 2.5 | 2.2 |
| C2 NMR | wt % | 1.7 | 1.8 | 1.6 | 1.0 | 1.3 |
| IZOD 23° C. 24 h | KJ/M2 | 6.7 | 7.2 | 6.7 | 4.7 | 5.1 |
| MEF 24 h | N/MM2 | 665 | 600 | 665 | 810 | 835 |
| Tm | ° C. | 132.3 | 132.3 | 132.1 | 137.9 | 137.1 |
| Tc | ° c. | 88.1 | 86.6 | 86.6 | 97.1 | 96.7 |
| SIT on BOPP | ° C. | 110 | 110 | 110 | 116 | 116 |
| Haze on film | % | 0.2 | 0.2 | 0.2 | 0.5 | 0.2 |
| Gloss on film (45') | N | 95.2 | 96.1 | 96 | 95.9 | 96.3 |
| Tm-SIT | ° C. | 22.3 | 22.3 | 22.1 | 21.9 | 21.1 |

Comparative Example 6

Example 2 of WO 2006/002778 has been replied.

Comparative Example 7

A copolymer is prepared by polymerising propylene, ethylene and hexene-1 in the presence of a catalyst under continuous conditions in a plant comprising a polymerisation apparatus.

The catalyst is sent to the polymerisation apparatus that comprises two interconnected cylindrical reactors, riser and downcomer. Fast fluidisation conditions are established in the riser by recycling gas from the gas-solid separator.

The way to differentiate the gas composition in the two reactor legs is the "barrier" feed. This stream is propylene fed in the larger upper part of the downcomer.

The catalyst employed comprises a catalyst component prepared by analogy with example 5 of EP-A-728 769 but using microspheroidal $MgCl_2.1.7C_2H_5OH$ instead of $MgCl_2.2.1C_2H_5OH$. Such catalyst component is used with dicyclopentyl dimethoxy silane (DCPMS) as external donor and with triethylaluminium (TEA).

The copolymer shows a broad distribution of the molecular weights obtained by using a liquid barrier according to the process described in EP 1012195. The polymer particles exiting the reactor are subjected to a steam treatment to remove the reactive monomers and volatile substances and then dried. The main operative conditions and characteristics of the produced polymers are indicated in Table 4.

TABLE 4

| Comparative example | | 7 |
|---|---|---|
| TEA/solid catalyst component, g/g | | 5 |
| TEA/DCPMS, g/g | | 4 |
| $C_6/(C_3 + C_6)$, mol/mol | Riser | 0.030 |
| $C_6/(C_3 + C_6)$, mol/mol | Downcomer | 0.034 |
| $C_2/(C_3 + C_2)$, mol/mol | Riser | 0.005 |
| $C_2/(C_3 + C_2)$, mol/mol | Downcomer | 0.002 |

C2 ethylene; C3 propylene; C6 1-hexene

The polymers of comparative examples 6 and 7 have been added with additives and peroxides according to table 5. Then the polymer mixtures have been placed in a twin screw extruder Berstorff (L/D=33) and extruded in the following operating conditions:

temperature of feeding part: 190-210° C.;

melt temperature: 235-245° C.;

temperature of die part: 210° C.;

flow rate: 15 kg/h;

rotational speed of the screw: 250 rpm.

TABLE 5

| Comparative example | | 6 | 7 |
|---|---|---|---|
| A.O.1010 | wt % | 0.05 | 0.05 |
| Ca stear. | wt % | 0.05 | 0.05 |
| M.S.168 | wt % | 0.1 | 0.1 |
| Luperox | wt % | 0.025 | 0.02 |

Biaxially oriented films of the polymers of comparative examples 6-7 have been produced. The analysis of the films and the characteristics of the polymers are reported on table 6

TABLE 6

| Comparative example | | 6 | 7 |
|---|---|---|---|
| XS | % | 8 | 6 |
| Polydispersity index | | 5.4 | 4.1 |
| MFR | g/10 min | 5 | 5.5 |
| C6 NMR | wt % | 1.3 | 3 |
| C2 NMR | wt % | 3.3 | 1,2 |
| Tm | ° C. | 141 | 136 |
| SIT on BOPP | ° C. | 122 | 118 |
| Tm-SIT | ° C. | 19 | 18 |

By comparing the values of the differences between the melting point and the SIT of the film on tables 3 and 6 it can be seen that the terpolymers according to the present invention show a higher delta, which is a highly useful feature as it widens their operational window.

The invention claimed is:

1. A propylene/ethylene/1-hexene terpolymer comprising:
   (A) 1.0 to 2.5 wt %, based upon the total weight of the terpolymer, of ethylene derived units;
   (B) 2.0 to 3.5 wt %, based upon the total weight of the terpolymer, of 1-hexene derived units; and
   (C) 94 to 97 wt %, based upon the total weight of the terpolymer, of propylene derived units,
   wherein the relative amounts of ethylene and 1-hexene derived units fulfils the following relationship (i):

$$0.5 < C6-C2 < 1.7 \quad \text{(i)}$$

wherein C2 is the amount in wt % of ethylene derived units and C6 is the amount in wt % of 1-hexene derived units,
   wherein the terpolymer has:
   (a) a polydispersity Index ranging from 2 to 4.5;
   (b) a melting temperature ranging from 125 to 138° C.;
   (c) a melting temperature that fulfils the following relationship (ii):

$$C2+C6 < 37-0.24*Tm \quad \text{(ii)}$$

wherein Tm is melting temperature, C2 is the amount in wt % of ethylene derived units, and C6 is the amount in wt % of 1-hexene derived units
   (d) a melt flow rate, measured according to ISO method 1133, ranging from 4 to 7 g/10 min.

2. The terpolymer of claim 1, wherein the relative amounts of ethylene and 1-hexene derived units fulfils the following relationship (i)

$$0.7 < C6-C2 < 1.7 \quad \text{(i).}$$

3. The terpolymer of claim 1 comprising:
   (A) 1.5 to 2.5 wt %, based upon the total weight of the terpolymer, of ethylene derived units.

4. The terpolymer of claim 1 comprising:
   (B) 2.5 to 3.5 wt %, based upon the total weight of the terpolymer, of 1-hexene derived units.

5. The terpolymer of claim 1, wherein the melting temperature fulfils the following relationship (ii):

$$C2+C6 < 36.8-0.24*Tm \quad \text{(ii).}$$

6. The terpolymer of claim 1, wherein the terpolymer has a crystallization temperature ranging from 80° C. to 95° C.

7. A film comprising a terpolymer,
   wherein the terpolymer comprises:
   (A) 1.0 to 2.5 wt %, based upon the total weight of the terpolymer, of ethylene derived units;
   (B) 2.0 to 3.5 wt %, based upon the total weight of the terpolymer, of 1-hexene derived units; and
   (C) 94 to 97 wt %, based upon the total weight of the terpolymer, of propylene derived units,
   wherein the relative amounts of ethylene and 1-hexene derived units fulfils the following relationship (i):

$$0.5 < C6-C2 < 1.7 \quad \text{(i)}$$

wherein C2 is the amount in wt % of ethylene derived units and C6 is the amount in wt % of 1-hexene derived units,
   wherein the terpolymer has:
   (a) a polydispersity Index ranging from 2 to 4.5;
   (b) a melting temperature ranging from 125 to 138° C.;
   (c) a melting temperature that fulfils the following relationship (ii):

$$C2+C6 < 37-0.24*Tm \quad \text{(ii)}$$

wherein Tm is melting temperature, C2 is the amount in wt % of ethylene derived units, and C6 is the amount in wt % of 1-hexene derived units (d) a melt flow rate, measured according to ISO method 1133, ranging from 4 to 7 g/10 min.

8. The film of claim 7, wherein the film has a seal initiation temperature ranging from 100° C. and 120° C.

9. The film of claim 7, wherein the film is a biaxially oriented film.

\* \* \* \* \*